United States Patent [19]

Feller et al.

[11] Patent Number: 4,744,470
[45] Date of Patent: May 17, 1988

[54] APPARATUS FOR SEPARATING AGRICULTURAL PRODUCE FROM SPURIOUS MATTER

[75] Inventors: Ron Feller, Ramat Efal; Shmuel Gan-Mor, Rehovot; Avi Zacharin, Moshav Magshimim; Ehud Margolin, Tel Aviv, all of Israel

[73] Assignee: State of Israel Ministry of Agriculture Volcani Research Center, Bet Dagan, Israel

[21] Appl. No.: 828,038

[22] Filed: Feb. 10, 1986

[30] Foreign Application Priority Data

Apr. 11, 1985 [IL] Israel .................................. 74885

[51] Int. Cl.⁴ .............................................. B07C 5/00
[52] U.S. Cl. ..................................... 209/640; 209/637
[58] Field of Search ............... 209/637, 638, 640, 699, 209/631, 642

[56] References Cited

U.S. PATENT DOCUMENTS

| | | | |
|---|---|---|---|
| 1,641,492 | 9/1927 | Jasperson | 209/632 |
| 1,692,343 | 11/1928 | Möller | 209/640 |
| 2,666,524 | 1/1954 | Payne | 209/640 |
| 2,932,393 | 4/1960 | Leslie | 209/640 |
| 4,281,766 | 8/1981 | Constantine | 209/640 |
| 4,375,853 | 3/1983 | Feller et al. | 209/640 |
| 4,535,894 | 8/1985 | Shell | 209/681 |

FOREIGN PATENT DOCUMENTS

| | | |
|---|---|---|
| 131758 | 4/1947 | Australia . |
| 75628181 | 9/1981 | Australia . |
| 872685 | 7/1951 | Fed. Rep. of Germany . |
| 20730 | 4/1919 | France . |
| 8301221 | 4/1983 | Netherlands . |
| 329637 | 6/1958 | Switzerland . |
| 5783 | of 1899 | United Kingdom ............ 209/640 |
| 350497 | 6/1931 | United Kingdom . |
| 708024 | 4/1954 | United Kingdom . |
| 900784 | 7/1962 | United Kingdom . |
| 1419348 | 12/1975 | United Kingdom . |
| 2037186 | 7/1980 | United Kingdom . |
| 181561 | 4/1966 | U.S.S.R. . |
| 755238 | 8/1980 | U.S.S.R. . |
| 887038 | 12/1981 | U.S.S.R. ............ 209/640 |

OTHER PUBLICATIONS

S. Gan-Mor et al., "Absorbing Stone Impact to Enable Separation From Potatoes", *Transactions of the ASAE*, Dec., 1986, pp. 1526-1529.

Agricultural Engineering Record, National Institute of Agricultural Engineering, Silsoe-Bedfordshire, U.K., vol. II, Autumn 1947-Summer 1949, pp. 33-42.

Derwent Publications, Ltd., Russian Summary, Week 1017, Jun. 3, 1981, London, G. Britain.

Feller et al., "Development of a Clod Separator for Potato Packing Houses," ASAE Transactions, vol. 28(4), 1985, pp. 1019-1023.

Feller et al., "Separation of Soil Clods from Onions Using Impact," ASAE Transactions, vol. 27(2), 1984, pp. 353-357.

*Primary Examiner*—David A. Scherbel
*Assistant Examiner*—Donald T. Hajec
*Attorney, Agent, or Firm*—Ladas & Parry

[57] ABSTRACT

Apparatus for separating a mixture of agricultural products and stones including an impact element defining an impact surface, which element is operative to absorb appreciable kinetic energy from stones but to absorb a significanty lower amount of kinetic energy from agricultural products sought to be separated therefrom and apparatus for causing the mixture of agricultural products and stones to impinge on the impact surface.

14 Claims, 8 Drawing Sheets

APPARATUS FOR SEPARATING AGRICULTURAL PRODUCE FROM SPURIOUS MATTER

FIELD OF THE INVENTION

The present invention relates to agricultural apparatus generally and more particularly to devices for separating agricultural produce from spurious matter such as clods and stones.

BACKGROUND OF THE INVENTION

Certain agricultural products, such as potatoes, which grow underground, may need to be separated from clods and stones before being marketed. There is described in Applicant/Assignee's published German Patent Application No. P 33 06 769.4 apparatus for separation of a mixture of soil clods from potatoes by bouncing the mixture to be separated on a cylindrical drum. This apparatus operates on the basis of a difference of about 0.4 in the restitution coefficient of the potatoes and soil clods. The aforesaid apparatus has met with considerable commercial success.

The separation of potatoes from stones is not achieved by the apparatus of the aforesaid German Patent Application, since the restitution coefficients of potatoes and stones against a rigid surface are nearly the same, and the restitution coefficient of the stones normally may even exceed that of the potatoes.

SUMMARY OF THE INVENTION

The present invention seeks to provide apparatus for separation of agricultural products from stones by bouncing.

There is thus provided in accordance with an embodiment of the present invention, apparatus for separating a mixture of agricultural products and stones including an impact element defining an impact surface, which element is operative to absorb appreciable kinetic energy from stones but to absorb a significantly lower amount of kinetic energy from agricultural products sought to be separated therefrom and apparatus for causing the mixture of agricultural products and stones to impinge on the impact surface.

In accordance with a preferred embodiment of the present invention, the impact element comprises a plate element. The term "plate" is used to denote a relatively thin element which is susceptible to bending and is not used here in its limiting sense to refer only to planar elements. Rather, the plate element may comprise a planar or somewhat curved slab of material or, alternatively, for example, such a slab curved into a continuous ring defining a cylindrical surface. Although the phenomenon of energy absorption by the element is not fully understood by Applicants', it is understood that the primary mechanism for kinetic energy absorption by the plate element is through bending thereof and the propagation of vibrations therethrough.

According to the present invention, whose effectiveness has been demonstrated empirically, stones, which are characterized by greater density and hardness than agricultural produce such as potatoes, lose relatively more energy to the impact element than do potatoes and the like, whose softer structure allows more compression and spreading out of the impact forces over a longer contact time, with the result that the potatoes bounce further from the impact surface than do stones and are separated thereby.

Selection of an appropriate element and mounting therefore for separation of a given agricultural product having given characteristics of density, elasticity, hardness and mass from stones and clods of known characteristics is achieved empirically, based on the teachings of the present invention, provided herein.

Additionally in accordance with a preferred embodiment of the invention, the impact element comprises a plate element which is resiliently mounted, whereby during the characteristic dwell time of stones in contact with the impact surface, significant energy absorption occurs, while during the longer dwell time of agricultural produce thereon, the net energy absorption is relatively insignificant, thereby causing the restitution coefficient of the agricultural produce to exceed that of the stones.

Further in accordance with an embodiment of the present invention, the impact element comprises a plurality of independently mounted sections, each of which is arranged to be impacted by a single stone or item of agricultural produce at any given instant.

Additionally in accordance with an embodiment of the present invention, the impact element comprises a rigidly mounted plate. Alternatively the impact element comprises a plate mounted on only one edge. As a further alternative, the impact element comprises a composite element including a rigid plate and a spring mounting therefore.

In accordance with a preferred embodiment of the invention, the above-described apparatus is also operative for separating agricultural products from clods at the same time as it separates the agricultural products from stones. As noted above, in separating stones from agricultural produce, the impact element absorbs most of the kinetic energy of the stones, which are relatively hard, by displacement of the mass of the impact element due to the provision of the resilient material underlying the plate element, bending of the plate element and propagation of vibrations therethrough, or any combination of the above.

In accordance with this preferred embodiment of the invention, the impact surface is stiff enough to be generally unaffected by the impact thereon of softer agricultural products, which rebound therefrom, as from a rigid surface.

As for clods, if they are hard and not brittle, they behave as stones and are separated as described hereinabove. If the clod is soft or brittle, as is usually the case, impact thereof on the impact element causes an irreversible deformation of the clod, such as breaking up or plastic deformation, thus absorbing most of its kinetic energy and causing the clod to rebound much less than the agricultural products.

Further in accordance with a preferred embodiment of the present invention, there is provided apparatus for separating agricultural produce from stones and clods comprising an impact element defining an impact surface, the impact element having kinetic energy absorption characteristics which cause the impact element to be operative to absorb appreciable kinetic energy from stones but to absorb a significantly lower amount of kinetic energy from agricultural products, apparatus for causing the mixture of agricultural products, clods and stones to impinge on the impact surface, first collection apparatus disposed in a first region with respect to the impact surface for receiving clods and stones bounced from the impact surface within a first range of distances, and second collection apparatus disposed in a second region with respect to the impact surface, and separated from the first region, for receiving agricultural produce bounced from the impact surface within a second range of distances.

Additionally in accordance with a preferred embodiment of the invention, the apparatus for separating also comprises third collection apparatus, which may be disposed intermediate the first and second regions but need not be so disposed, for receiving a mixture of unseparated agricultural produce, clods and stones bounced from the impact surface, and apparatus for resupplying the mixture of unseparated agricultural produce from the third collection apparatus back to the impact surface for repeated separation.

Additionally in accordance with an embodiment of the present invention, the above-described apparatus for separating stones and clods from agricultural produce includes apparatus for limiting the resupply from the third collection apparatus to one resupply cycle.

Additionally in accordance with an embodiment of the invention there is provided apparatus for separating a mixture containing first and second items of differing hardness and density into its constituents, including an impact element defining an impact surface, which element is operative to absorb appreciable kinetic energy from the first items but to absorb a significantly lower amount of kinetic energy from the second items sought to be separated therefrom and apparatus for causing the mixture to impinge on the impact surface.

There is also provided a method of separating a mixture containing first and second items of differing hardness and density into its constituents, including the step of causing the mixture to impinge on an impact surface of an impact element whereby the impact surface absorbs appreciable kinetic energy from the first items but absorbs a significantly lower amount of kinetic energy from the second items, such that the second items bounce further from the impact surface than do the first items.

Additionally in accordance with an embodiment of the invention, the method of separating also includes the steps of receiving first items bounced from the impact surface within a first range of distances, receiving second items bounced from the impact surface within a second range of distances, receiving a mixture of the first and second items from the impact surface at a range of distances intermediate the first and second range of distances, and resupplying the mixture of first and second items received at the intermediate range of distances back to the impact surface for repeated separation.

BRIEF DESCRIPTION OF THE DRAWINGS

The present invention will be understood and appreciated more fully from the following detailed description, taken in conjunction with the drawings in which.

DETAILED DESCRIPTION OF A PREFERRED EMBODIMENT

The present invention will be described in the context of a preferred embodiment relating to apparatus for the separation of agricultural products, such as potatoes, from clods and stones. It is appreciated that the present invention has application in various other contexts and is not limited to the context described hereinbelow.

Figure 1A:
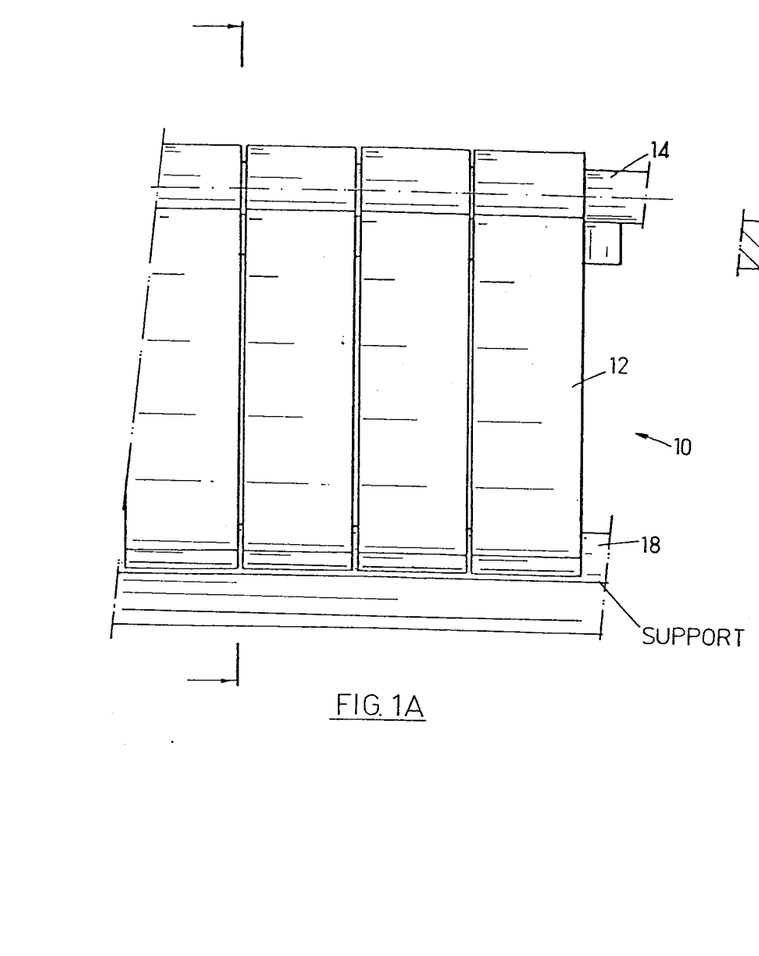
FIGS. 1A and 1B are respective plan and side view illustrations of a resiliently-mounted impact element constructed and operative in accordance with an embodiment of the present invention.
Figure 1B:
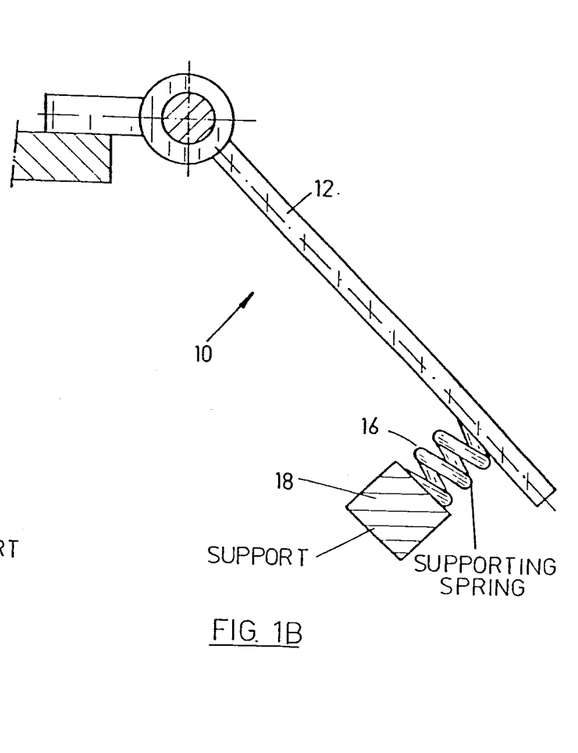

Reference is now made to FIGS. 1A and 1B which illustrate a spring mounted impact element assembly constructed and operative in accordance with a preferred embodiment of the present invention. The impact surface assembly, indicated generally by reference numeral 10, comprises a plurality of coplanar individual strips 12 of rigid material, typically steel, which are pivotably mounted at one end thereof on a transverse support rod 14. The opposite ends of the individual strips 12 of rigid material are individually mounted on support springs 16, typically coil springs, onto a transverse support 18.

The assembly of FIGS. 1A and 1B is designed such that each of strips 12 is generally impinged upon by one falling object at any given time. Since stones are more rigid and are of a higher density than agricultural produce such as potatoes and other perishable products having a relatively high water content, they impact on a given strip 12 harder, i.e. with greater force, than do potatoes and the like. This impact produces compression of the spring support of the strip 12, and consequent retraction of the impact surface.

Compression of the spring support is mainly a function of the mass of the impinging item. Since a usual mixture of agricultural produce and stones includes items of both types of varying sizes and masses, a distinction based on mass alone normally is not sufficient for efficient separation, although it does provide separation of heavy stones from relatively light produce items.

The impact force of stones on the impact surface also causes internal vibrations in the strip 12. These vibrations, and bending of the impact element as well as compression of the spring support all serve to absorb kinetic energy from the impinging stone and thus to decrease its rebound velocity.

The impact of potatoes and similar agricultural produce on the impact surface does not produce as much bending or internal vibrations in the strip as does the impact of stones. This is due to the relative softness and longer dwell time of the agricultural produce in contact with the impact surface, which prevents a high instantaneous impact force from being developed, since the agricultural produce undergoes compression upon impact, which a stone does not. Furthermore, the agricultural produce may have a sufficiently long dwell time in contact with the impact surface, to receive kinetic energy back from the spring support as it rebounds.

Figure 2A:
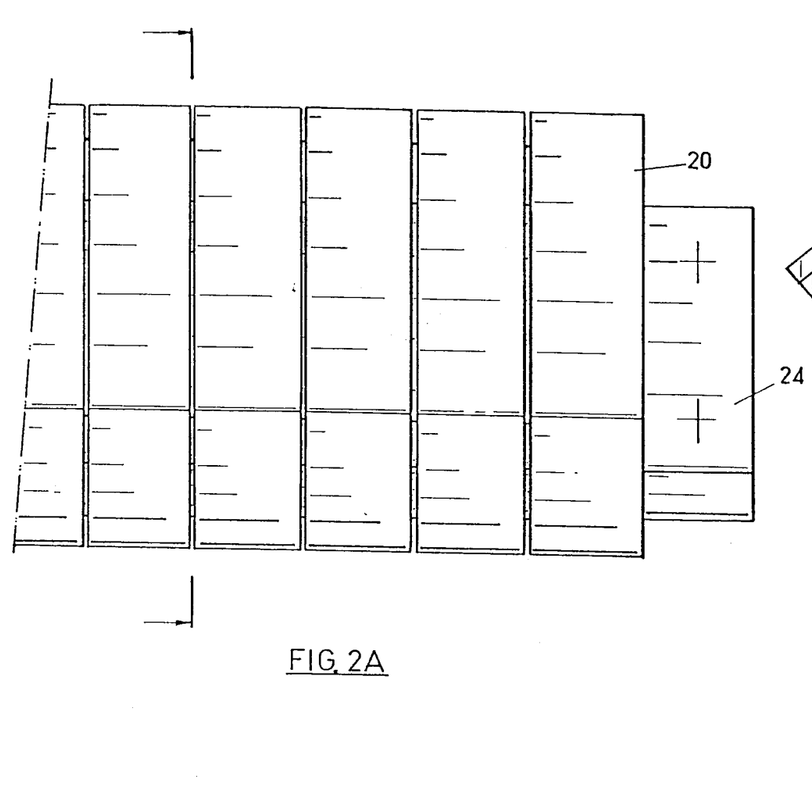
FIGS. 2A and 2B are respective plan and side view illustrations of a resiliently-mounted impact element constructed and operative in accordance with an alternative embodiment of the present invention.
Figure 2B:
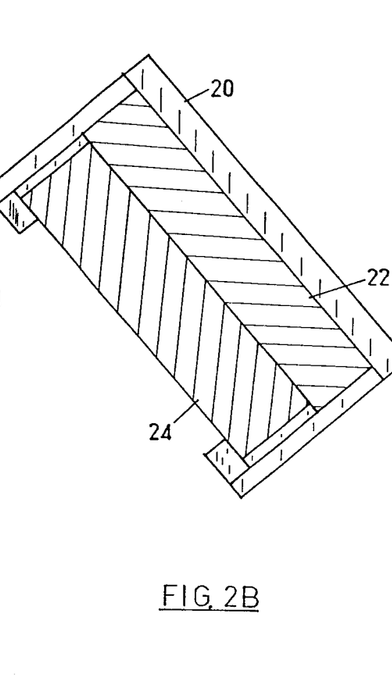

Reference is now made to FIGS. 2A and 2B which illustrate an alternative embodiment of a resiliently-mounted impact element assembly constructed and operative in accordance with a preferred embodiment of the present invention. The assembly of FIGS. 2A and 2B comprises a plurality of strips 20 which are supported along all or most of their length by a rubber pad 22, defining a spring. The rubber pad 22 is supported, in turn, by a solid base 24.

A preferred embodiment of the impact surface assembly of FIGS. 2A and 2B employs strips 20 made of steel of 10 mm thickness, 38 mm width and 640 gram weight. Pad 22 comprises foam rubber of 35 shore (ASTM RE 43) of 36 mm thickness.

Figure 3A:
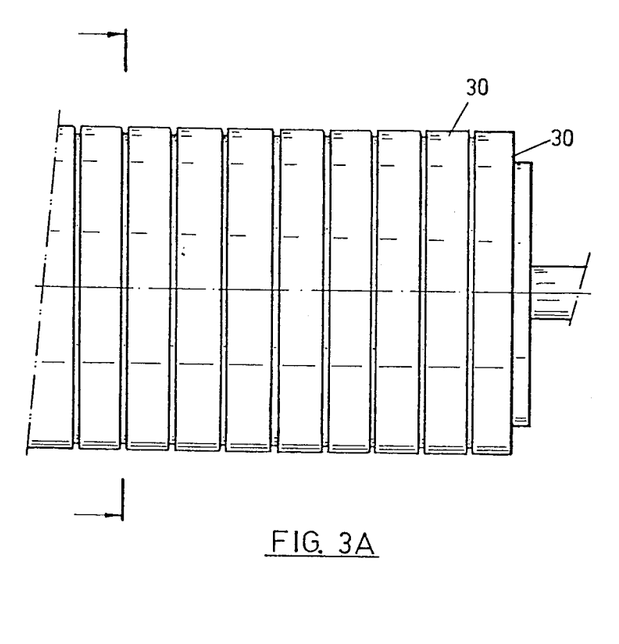
FIGS. 3A and 3B are respective plan and side view illustrations of a resiliently-mounted cylindrical impact element constructed and operative in accordance with an embodiment of the present invention.
Figure 3B:
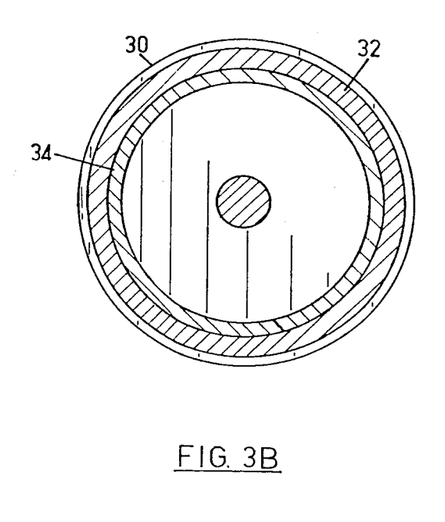
Figure 4A:
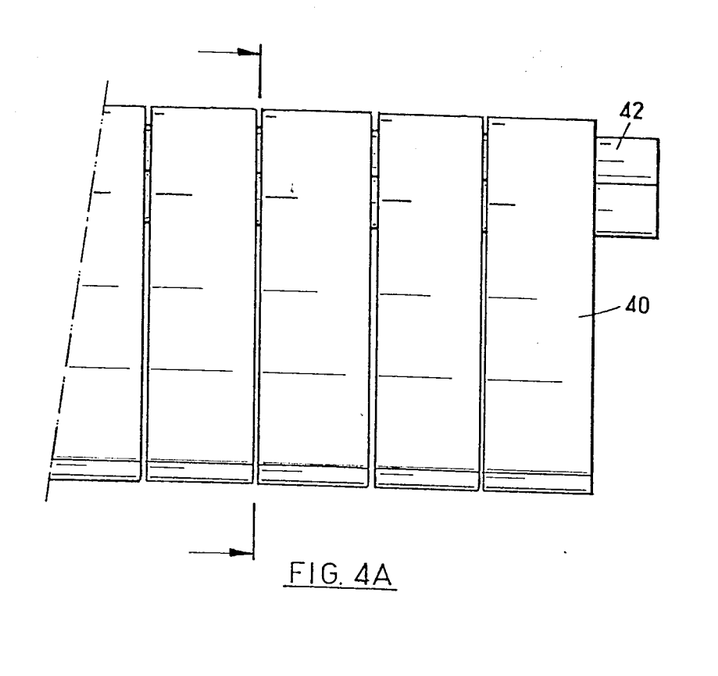
FIGS. 4A and 4B are respective plan and side view illustrations of a planar impact element constructed and operative in accordance with an alternative embodiment of the present invention.
Figure 4B:
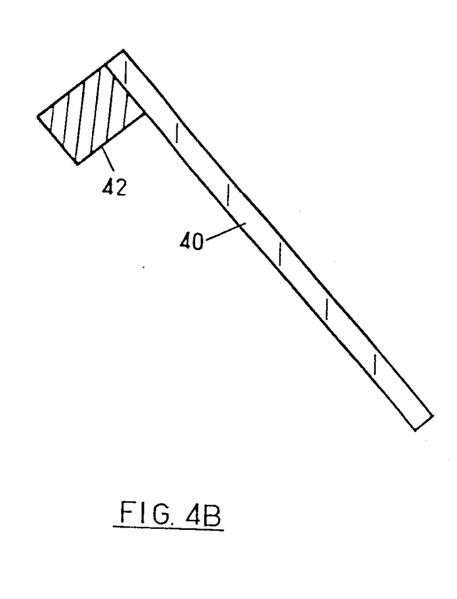

This embodiment has provided efficient separation of potatoes and stones having the following characteristics (given approximately):
Stone Density: 2.5–3.0 gr/cm3
Stone Weight: 120–350 gr
Potato Density: 0.9 gr/cm3
Potato Weight: 40–250 gr FIGS. 3A and 3B illustrate yet another embodiment of the present invention wherein the impact surface assembly comprises a plurality of cylindrical rings 30 which are supported on a cylindrical layer of foam rubber 32, which in turn is supported on a cylinder 34, typically formed of steel. According to a preferred embodiment of the present invention, the specifications of the impact surface assembly shown in FIGS. 3A and 3B are as follows: Each ring 30 is made of steel 8 mm thick, 50 mm wide and having an outer diameter of 320 mm. The foam rubber layer 32 is 16 mm thick and of 35 shore (ASTM RE 43). This embodiment has provided efficient separation of potatoes and stone having the following characteristics (given approximately):
Stone Density: 2.0–3.0 gr/cm3
Stone Weight: 120–470 gr
Potato Density: 0.9 gr/cm3
Potato Weight: 40–300 gr FIGS. 4A and 4B illustrate an alternative embodiment of an impact element assembly of the type described hereinabove in connection with FIGS. 1A, 1B, 2A and 2B. Here, in contrast, to the embodiments there illustrated, the impact surface assembly comprises a plurality of strips 40 which are rigidly mounted at one end onto a transverse support 42 and are free at their opposite ends. The inherent resiliency of the individual strips 40 provides the necessary conditions for proper separation operation.

Figure 5A:
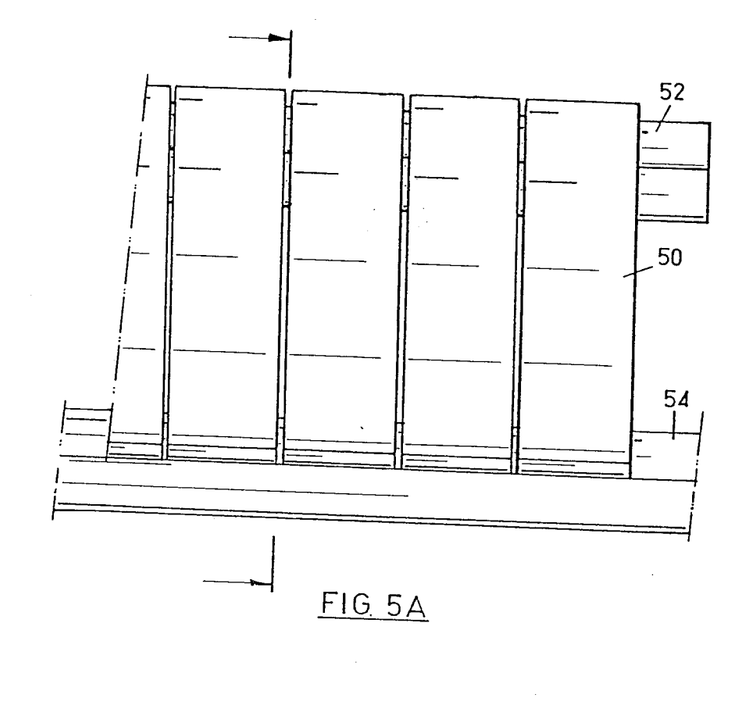
FIGS. 5A and 5B are respective plan and side view illustrations of a rigidly mounted planar impact surface constructed and operative in accordance with a further alternative embodiment of the present invention.
Figure 5B:
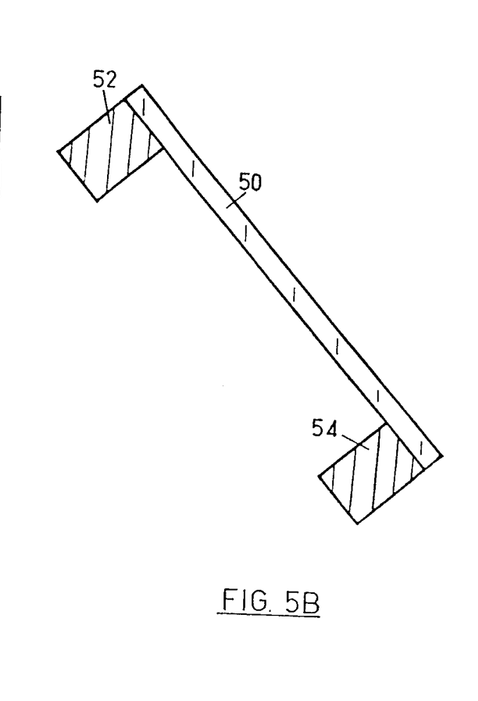

FIGS. 5A and 5B illustrate another alternative embodiment of impact surface assembly of the type described hereinabove in connection with FIGS. 1A, 1B, 2A and 2B. Here, in contrast, to the embodiments illustrated there and in FIGS. 4A and 4B, the impact surface assembly comprises a plurality of strips 50 which are rigidly mounted at one end onto a transverse support 52 and at their opposite ends to a transverse support 54. In this embodiment, separation is provided merely by the internal bending and vibrations in the strips 50.

Figure 6:
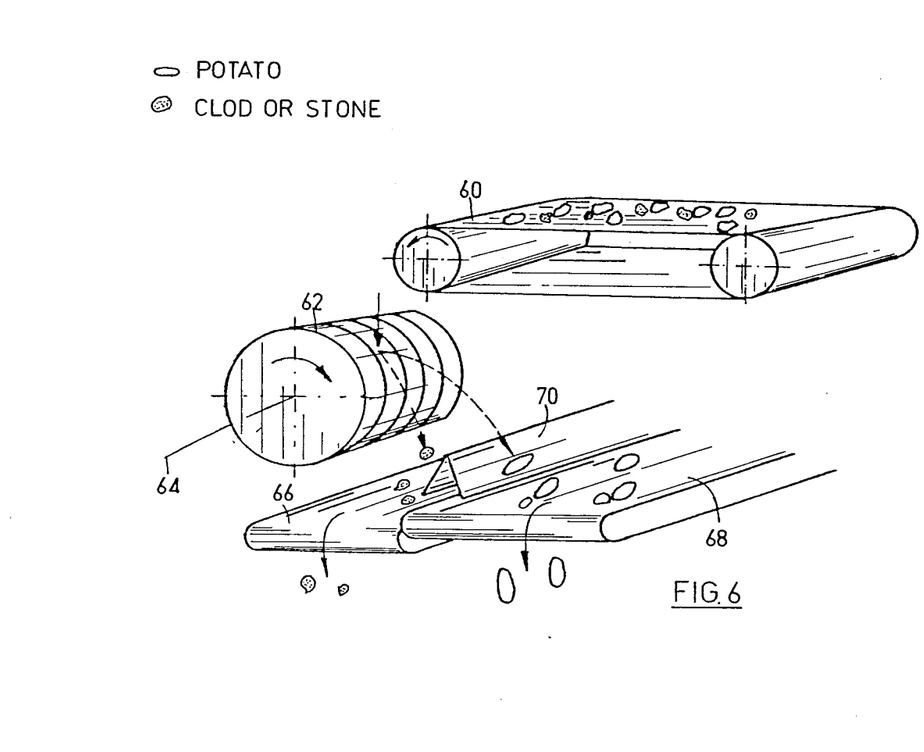
FIG. 6 is a pictorial schematic illustration of apparatus for separating agricultural produce from clods and stones in accordance with one embodiment of the invention.

Reference is now made to FIG. 6, which shows in a schematic pictorial illustration, apparatus for separating clods and stones from agricultural produce such as potatoes constructed and operative in accordance with a preferred embodiment of the present invention. The apparatus comprises a conveyor 60 which supplies a mixture of potatoes, clods and stones (and possibly other materials as well), so as to impinge on an impact surface of an impact element assembly 62. Preferably the height from which the mixture is dropped onto the impact surface assembly 62 is limited to about 250 mm, so as to limit damage to the agricultural produce.

The impact surface assembly 62 is typically of the type described above in connection with FIGS. 3A and 3B and is arranged to be impinged at a surface thereof which is inclined between the horizontal and the vertical, typically having a tangent of 45 degrees with respect to the vertical. Preferably, the impact surface assembly 62 is rotated about its cylindrical axis 64, such that the location on the surface on which the mixture impacts has a horizontal component of motion, in a direction opposite to the horizontal component of motion of the mixture as it falls, which component of motion is imparted thereto by the horizontal component of motion of conveyor 60. Alternatively the horizontal components of motion of the mixture and of the impact surface may be in the same direction.

First and second collection zones are defined by first and second collection conveyors 66 and 68. The collection conveyor 66 nearer the impact surface assembly receives the stones and clods, and the collection conveyor 68, further from the impact surface assembly receives the potatoes. A divider element 70 separates the adjacent zones and ensures that material bounced from the impact surface assembly reaches one of the two conveyors depending on its precise position.

Figure 7A:
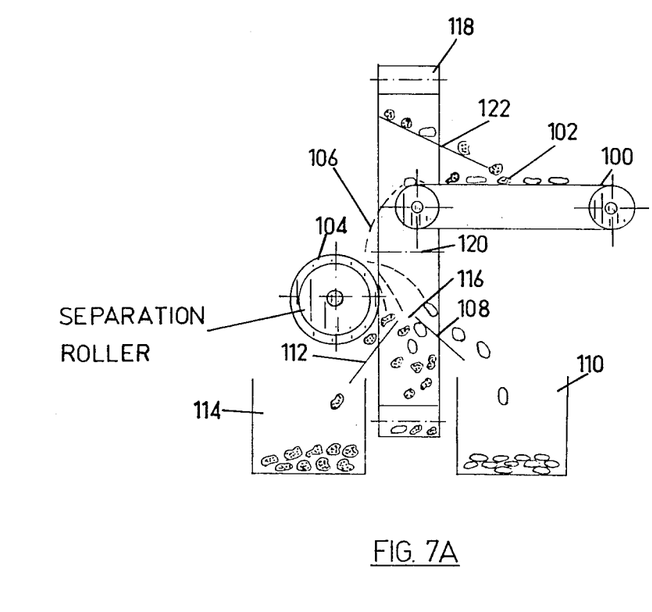
FIGS. 7A and 7B are respective plan and side view illustrations of apparatus for separating agricultural produce from clods and stones constructed and operative in accordance with an embodiment of the present invention.
Figure 7B:
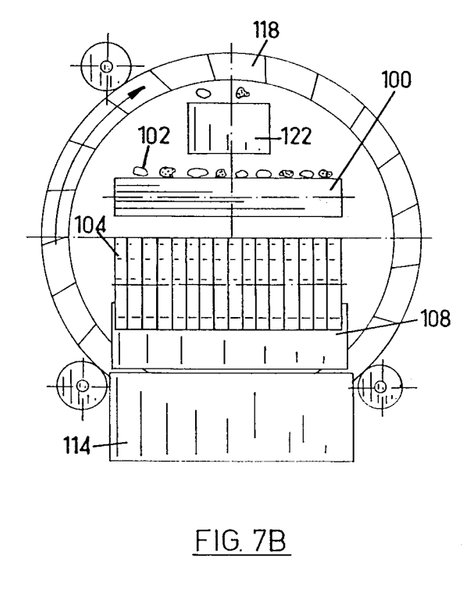

Reference is now made to FIGS. 7A and 7B, which illustrate a multiple stage separation device according to the present invention. Here it is seen that a conveyor 100 supplies a mixture 102 of potatoes, stones and clods to an impact element assembly 104, which may be similar to the impact element assembly 62 illustrated in FIG. 6.

The mixture impinges on the assembly 104 at an impact surface location 106 having a tangent approximately 45 degrees from the vertical and having a horizontal component of motion opposite to that of the mixture and a downward vertical component of motion. The potatoes, which bounce relatively far from the impact surface location, impinge on a slide 108 and are directed into a collection bin 110. The stones and clods, which bounce to a region relatively near the impact surface location impinge on a slide 112 and are directed into a collection bin 114.

In order to enhance the accuracy of separation, an intermediate region 116 is defined between the regions covered by respective slides 108 and 112. Into this region a mixture of stones clods and potatoes fall into a rotary conveyor 118 which rotates about an axis 120 and conveys the mixture onto a slide 122 which returns it to conveyor 100 for resupply to assembly 104.

Figures 8A, 8B, 8C:
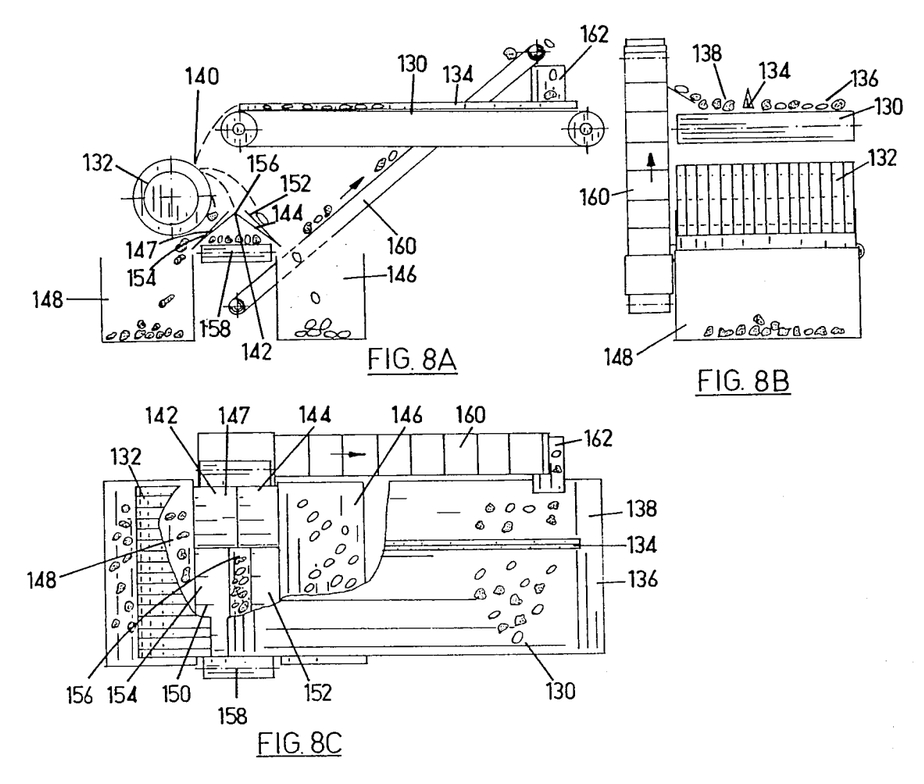
FIGS. 8A, 8B and 8C are respective plan, end and top view illustrations of apparatus for separating agricultural produce from clods and stones constructed and operative in accordance with an embodiment of the present invention.

FIGS. 8A–8C illustrate an alternative embodiment of separation apparatus which is designed to eliminate overload of the system by repeated recycling of unsorted mixtures of potatoes, clods and stones. Here a principle conveyor 130 supplies an unsorted mixture of clods and stones to an impact element assembly 132. Impact element assembly 132 is typically an impact element of the type described hereinabove for separating stones from agricultural products, such as that shown in FIGS. 3A and 3B. Alternatively, the impact element may be of the type employed for separating clods from agricultural products, as described in applicants published German Patent Application No. P 33 06 769.4.

A divider 134 is associated with conveyor 130 for defining a main area 136 thereof which carries a newly received mixture of clods, stones and potatoes and a side area 138 which carries a recycled mixture which was not previously separated.

The mixture impinges on the assembly 132 at an impact surface location 140 typically having a tangent approximately 45 degrees from the vertical and having a horizontal component of motion opposite to that of the mixture and a downward vertical component of motion. The portion of the mixture impinging on assembly 132 from the side area of the conveyor impinges on a gapless slide assembly 142. The potatoes, which bounce relatively far from the impact surface location, impinge on a slide portion 144 and are directed into a collection bin 146. The stones and clods, which bounce to a region relatively near to the impact surface location impinge on a slide portion 147 and are directed into a collection bin 148.

The mixture which impinges on assembly 132 from the main area 136 of the conveyor is supplied to a slide assembly 150, defining a first slide portion 152 which receives the potatoes and directs them to bin 146, a second slide portion 154, spaced from slide portion 152, which receives the stones and clods and directs them to bin 148 and an intermediate gap 156 which permits the unseparated mixture of stones, clods and potatoes bounced thereto to fall on a conveyor 158, which carries them to a raising conveyor 160, which supplies that mixture, via a slide 162 to side conveyor area 138 for a single recycle through the separation apparatus.

According to an alternative embodiment of the invention the intermediate gap 156 may be eliminated and the stones and clods from slide portion 154, which may contain unsorted agricultural produce, are supplied to conveyor 158 for recirculation.

It will be appreciated by persons skilled in the art that the present invention is not limited by what has been particularly shown and described herinabove. Rather the scope of the present invention is defined only by the claims which follow.

We claim:

1. Apparatus for separating a mixture of agricultural products and stones comprising:
    impact element means for providing separation of agricultural products and stones by bouncing them different distances, said impact element means including a plurality of independently resiliently mounted sections, each defining an impact surface, each being mounted independent of the other and being arranged so that when impacted by a single stone, significant energy absorption occurs during the characteristic dwell time of the stone in contact with the impact surface, and when impacted by an item of agricultural produce insignificant energy absorption occurs during the characteristic dwell time of the agricultural produce in contact with the impact surface, which is longer than the characteristic dwell time of the stone, such that said impact element means is operative to absorb appreciable kinetic energy from stones but to absorb a significantly lower amount of kinetic energy from agricultural products sought to be separated therefrom;
    means for causing the mixture of agricultural products and stones to impinge on said impact surfaces, whereby stones are caused to bounce within a first range of distances and agricultural produce is caused to bounce within a second range of distances, said second range of distances extending beyond said first range of distances.

2. Apparatus according to claim 1 and wherein said impact element means comprises a plate element.

3. Apparatus according to claim 2 and wherein said plate element comprises a curved plate element.

4. Apparatus according to claim 2 and wherein said plate element comprises a curved plate element in the form of a cylindrical ring.

5. Apparatus according to claim 1 and wherein said impact element means is operative to absorb kinetic energy from items impacting thereon as a positive function of the density, mass and hardness of such items.

6. Apparatus according to claim 1 and wherein said impact element means comprises a plurality of independently mounted sections, each of which is arranged to be normally impacted by a single stone or item of agricultural produce at any given instant.

7. Apparatus according to claim 1 and wherein said impact element means comprises a rigidly mounted plate.

8. Apparatus according to claim 1 and wherein said impact element means comprises a composite element including a plate and a spring mounting therefore.

9. Apparatus for separating agricultural produce from stones and clods comprising:
    impact element means for providing bouncing separation of agricultural products and stones by bouncing them different distances and including a plurality of independently resiliently mounted sections, each being mounted independent of the other and defining an impact surface, and being arranged so that when impacted by a single stone or clod, significant energy absorption occurs and when impacted by an item of agricultural produce insignificant energy absorption occurs, such that said impact element means is operative to absorb appreciable kinetic energy from stones and clods but to absorb a significantly lower amount of kinetic energy from agricultural products sought to be separated therefrom;
    means for causing the mixture of agricultural products, clods and stones to impinge on said impact surfaces such that each of said impact surfaces is generally impinged upon by one falling object at any given time, whereby stones and clods are caused to bounce within a first range of distances and agricultural produce is caused to bounce within a second range of distances, said second range of distances extending beyond said first range of distances;
    first collection means disposed in a first region with respect to the impact surfaces for receiving clods and stones bounced from the impact surfaces within a first range of distances; and
    second collection means disposed in a second region with respect to the impact surfaces, and separated from the first region, for receiving agricultural produce bounced from the impact surfaces within a second range of distances.

10. Apparatus according to claim 9 and also comprising:
third collection means for receiving a mixture of unseparated agricultural produce, clods and stones bounced from the impact surface; and
means for resupplying the mixture of unseparated agricultural produce from the third collection apparatus back to the impact surface for repeated separation.

11. Apparatus according to claim 10 and also comprising:
means for limiting the resupply from the third collection means to one resupply cycle.

12. Apparatus for separating a mixture containing first and second items of differing hardness and density into its constituents, the first items being of greater hardness and greater density than the second items, comprising:
impact element means for providing separation of said first and second items by bouncing thereof different distances and including a plurality of independently resiliently mounted sections, each defining an impact surface, and being arranged so that when impacted by a first item, significant energy absorption occurs during the characteristic dwell time of the first item in contact with the impact surface, and when impacted by a second item, insignificant energy absorption occurs during the characteristic dwell time of the second item in contact with the impact surface, which is longer than the characteristic dwell time of the first item, such that said impact element means is operative to absorb appreciable kinetic energy from the first items but to absorb a significantly lower amount of kinetic energy from the second items sought to be separated therefrom; and
means for causing the mixture to impinge on the impact surfaces such that each of said impact surfaces is generally impinged upon by one falling object at any given time, whereby said first items are caused to bounce within a first range of distances and second items are caused to bounce within a second range of distances, said second range of distances extending beyond said first range of distances.

13. A method of separating a mixture containing first and second items of differing hardness and density into its constituents, the first items being of greater hardness and greater density than the second items, the method including the step of:
causing the mixture to impinge on a plurality of impact surfaces of an impact element having a plurality of independently resiliently mounted sections, each being mounted independent of the other and defining an impact surface, such that each of said impact surfaces is generally impinged upon by one falling object at any given time, said impact surfaces being arranged so that when impacted by a first item, significant energy absorption occurs during the characteristic dwell time of the first item in contact with the impact surface, and when impacted by a second item insignificant energy absorption occurs during the characteristic dwell time of the second item in contact with the impact surface, which is longer than the characteristic dwell time of the first item, such that the second items bounce further from the impact surface than do the first items.

14. A method according to claim 13 and also including the steps of receiving first items bounced from the impact surface within a first range of distances, receiving second items bounced from the impact surface within a second range of distances, receiving a mixture of the first and second items from the impact surface at a range of distances intermediate the first and second range of distances, and resupplying the mixture of first and second items received at the intermediate range of distances back to the impact surface for repeated separation.

* * * * *